(12) United States Patent
Migaki

(10) Patent No.: US 9,457,735 B2
(45) Date of Patent: Oct. 4, 2016

(54) VEHICULAR INTERIOR COMPONENT

(71) Applicant: TOYOTA BOSHOKU KABUSHIKI KAISHA, Aichi-ken (JP)

(72) Inventor: Yohei Migaki, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/744,448

(22) Filed: Jun. 19, 2015

(65) Prior Publication Data

US 2015/0375692 A1 Dec. 31, 2015

(30) Foreign Application Priority Data

Jun. 27, 2014 (JP) .................................. 2014-132628

(51) Int. Cl.
*B60R 13/02* (2006.01)
*B60R 21/04* (2006.01)

(52) U.S. Cl.
CPC ........... *B60R 13/0206* (2013.01); *B60R 13/02* (2013.01); *B60R 13/0243* (2013.01); *B60R 21/0428* (2013.01)

(58) Field of Classification Search
CPC ....... B60J 5/045; B60J 5/0456; B60R 13/02; B60R 13/0206; B60R 13/0243; B60R 21/02; B60R 21/04; B60R 21/0428

USPC .................... 296/1.08, 39.1, 146.7, 152, 153
See application file for complete search history.

(56) References Cited

FOREIGN PATENT DOCUMENTS

JP        06270676 A   *  9/1994
JP        2010-264835       11/2010

OTHER PUBLICATIONS

English translation of JP 06-270676; retreived Apr. 14, 2016 from Japan Platform for Patent Information (https://www.j-platpat.inpit.go.jp/web/all/top/BTmTopEnglishPage).*

* cited by examiner

*Primary Examiner* — Jason S Daniels
(74) *Attorney, Agent, or Firm* — Greenblum & Bernstein, P.L.C.

(57) ABSTRACT

A vehicular interior component includes a trim board and an interior member. The trim board includes a decorative as a sidewall surface of a compartment of a vehicle and includes a mounting portion including a through hole and a clearance portion adjacent to the thorough hole. The interior member has a longitudinal shape and mounted to the trim body with a longitudinal dimension thereof along a horizontal direction. The interior member includes a mounting projection that projects toward the trim body. The mounting projection is arranged in the through hole and configured such that at least a portion thereof moves from the through hole to the clearance portion in a direction of an external load when the external load is applied to the interior member.

14 Claims, 8 Drawing Sheets

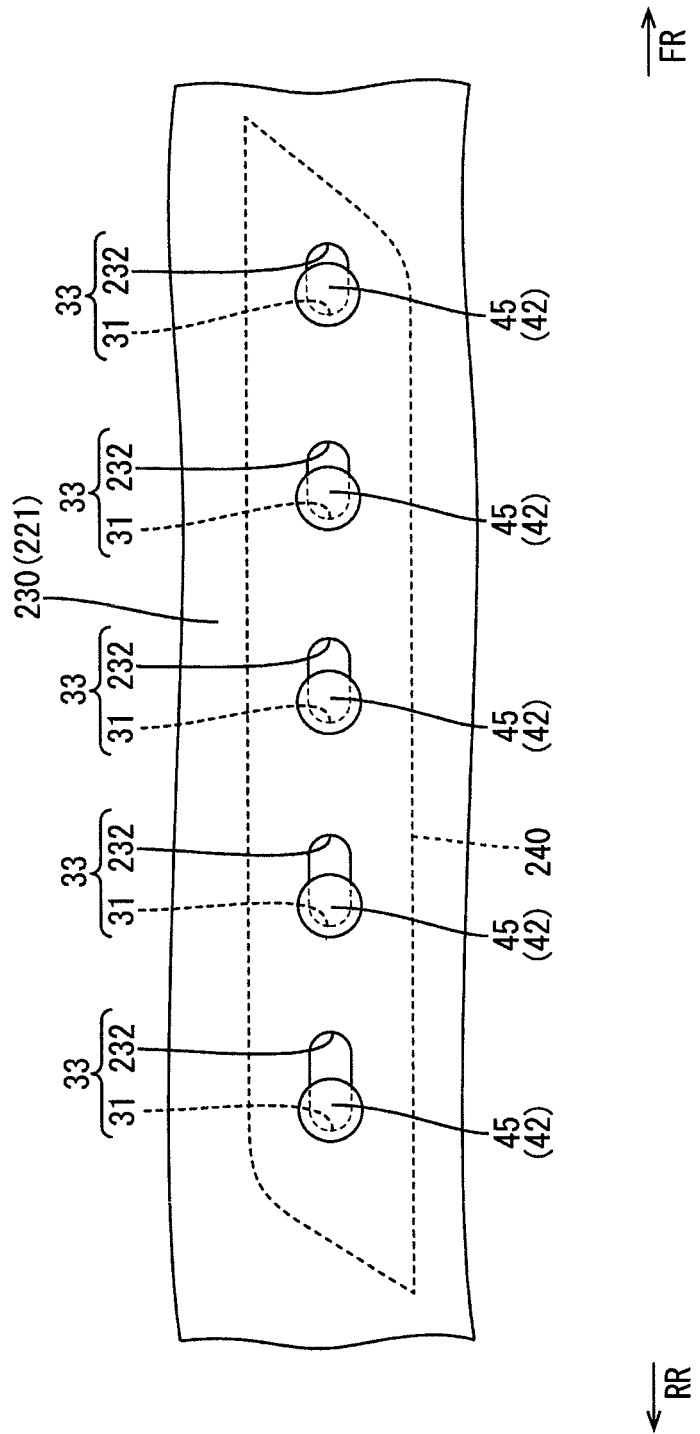

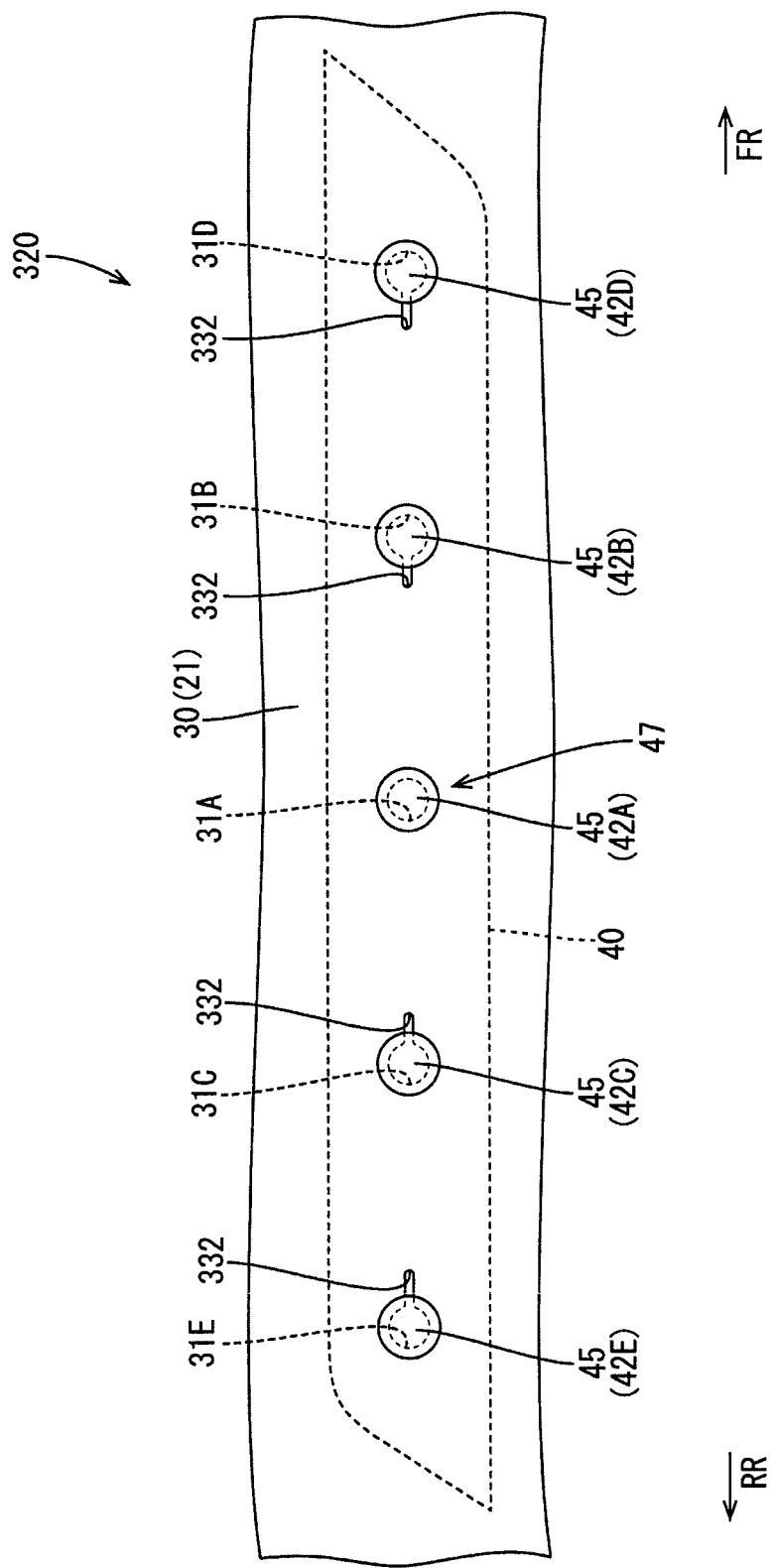

VEHICULAR INTERIOR COMPONENT

CROSS REFERENCE TO RELATED APPLICATION

This application claims priority from Japanese Patent Application No. 2014-132628 filed Jun. 27, 2014. The entire contents of the priority application are incorporated herein by reference.

TECHNICAL FIELD

The present disclosure relates to a vehicular interior component.

BACKGROUND

A trim board on which an ornament member (an interior member) is mounted has been known as an example of an interior component of a vehicle. The ornament member includes a panel and hollow mounting projections. The panel has a longitudinal shape that extends in the horizontal direction. The mounting projections protrude from a back surface of the panel toward the trim board. The hollows of the mounting projections are screw holes in which screws are fitted. An outer perimeter of each mounting projection is substantially the same as a perimeter of each through hole. Distal portions of the mounting projections are fitted in through holes of the trim board at a substantially right angle and the screws are fitted in the respective screw holes of the mounting projections. With the mounting projection, the through holes, and the screws, the ornament member is fixed to the trim board, specifically, to a surface of the trim board on a vehicular compartment side. Each mounting projection includes a rib at a projection base thereof closer to the back surface of the panel. The rib continues to the back surface of the ornament member.

In a collision, the vehicle may collide against an object such as a pole that extends in an upper-lower direction of the vehicle. In such a case, a portion of the vehicle body which has hit the pole may be dented. Namely, a portion of the interior component corresponding to the portion of the vehicle body may be pushed by the portion of the vehicle body toward the interior side of the vehicle and deformed. The trim board may be curved and the ornament member mounted to the trim board may be curved along the ornament member. If the trim board and the ornament member are curved, a force may be applied to the projection base of each mounting projection in a direction to displace the mounting projection from the corresponding through hole toward a portion of the ornament member to which the load is applied. However, the distal portions of the mounting projections may not be displaced from the respective through holes because the distal portions of the mounting projections are fixed. Therefore, stresses may be applied to the projection bases of the mounting projections. With the stresses, the angle of the distal portion of each mounting projection relative to the corresponding through hole may change from the original angle, that is, from the right angle. If the stresses are larger than a tolerance, the mounting projections may be broken at the projection bases or the ornament member may be broken.

One of solutions for reducing the breakage of the mounting projections is to increase rigidity of the mounting projections or to increase the number of ribs that continue from each mounting projection to the back surface of the ornament board. Another solution is to increase the thickness of the ribs. However, ribs having such configurations may create a dent in a decorative surface of the ornament member (i.e. a surface of the ornament member opposite to the back surface). Another solution to reduce the breakage of the mounting projections is to use materials having higher rigidity for the ornament member. However, such a material-based solution limits the materials applicable to the ornament member to some materials having high rigidity and such materials may limit the design range of the ornament member.

SUMMARY OF THE INVENTION

An objective of the present technology is to provide a vehicular interior component in which a mounting projection of the interior member is less likely to break.

To solve the above problems, a vehicular interior component includes a trim body and an interior member. The trim body includes a decorative surface as a sidewall surface of a compartment of a vehicle and includes a mounting portion including a through hole and a clearance portion adjacent to the thorough hole. The interior member has a longitudinal shape and is mounted to a decorative surface of the trim body with a longitudinal dimension thereof along a horizontal direction. The interior member includes a mounting projection projecting toward the trim body. The mounting projection is arranged in the through hole and configured such that at least a portion thereof moves from the through hole to the clearance portion in a direction of an external load when the external load is applied to the interior member.

BRIEF DESCRIPTION OF THE DRAWINGS

FIG. 7 is a plan view of the trim board in FIG. 6 seen from an outer side of a vehicle.

FIG. 8 is a plan view of a trim board according to a fourth embodiment seen from an outer side of a vehicle.

DETAILED DESCRIPTION

First Embodiment

Figure 1:
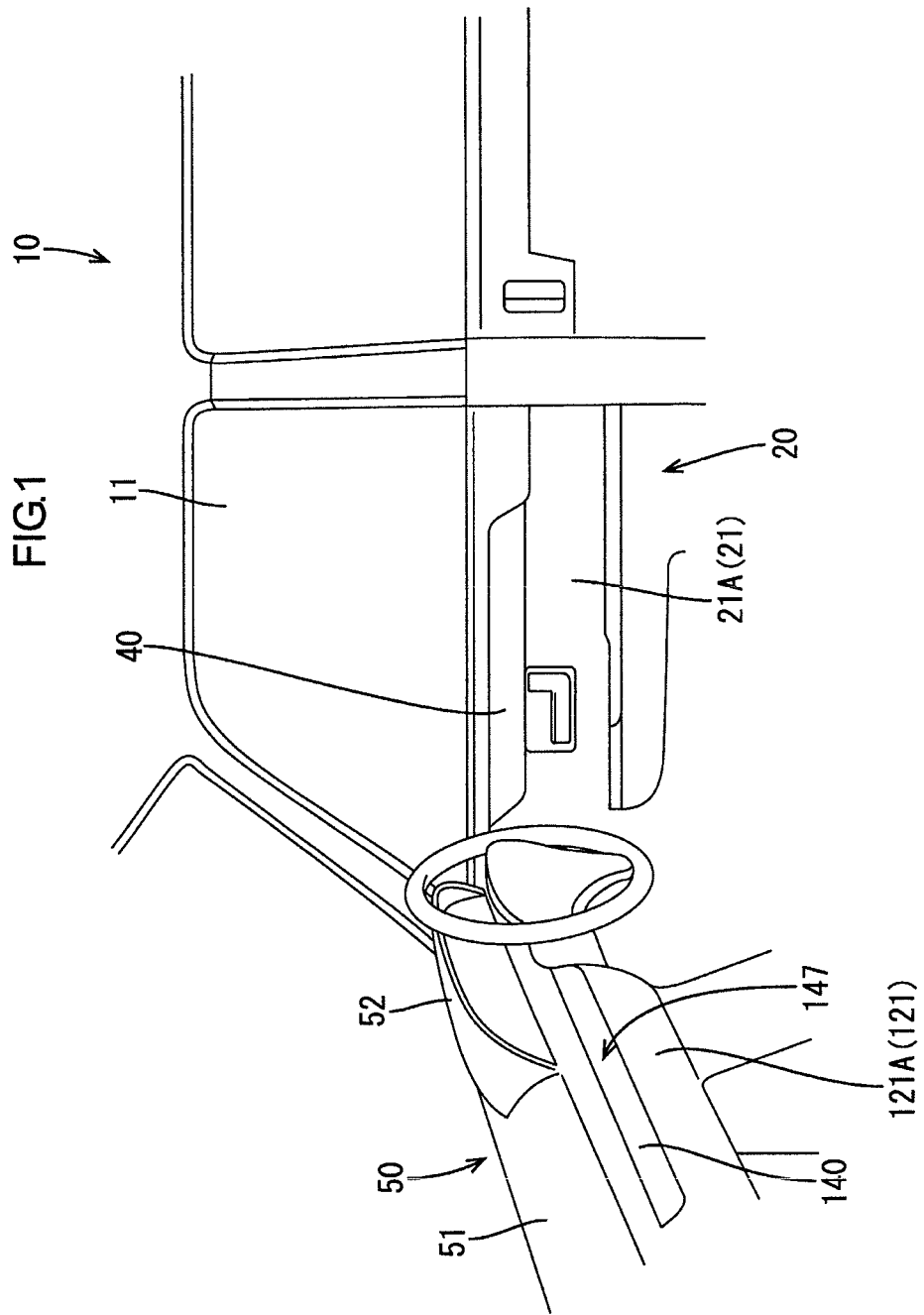
FIG. 1 is a perspective view of a vehicular interior component according to a first embodiment and a second embodiment of the present technology.
Figure 2:
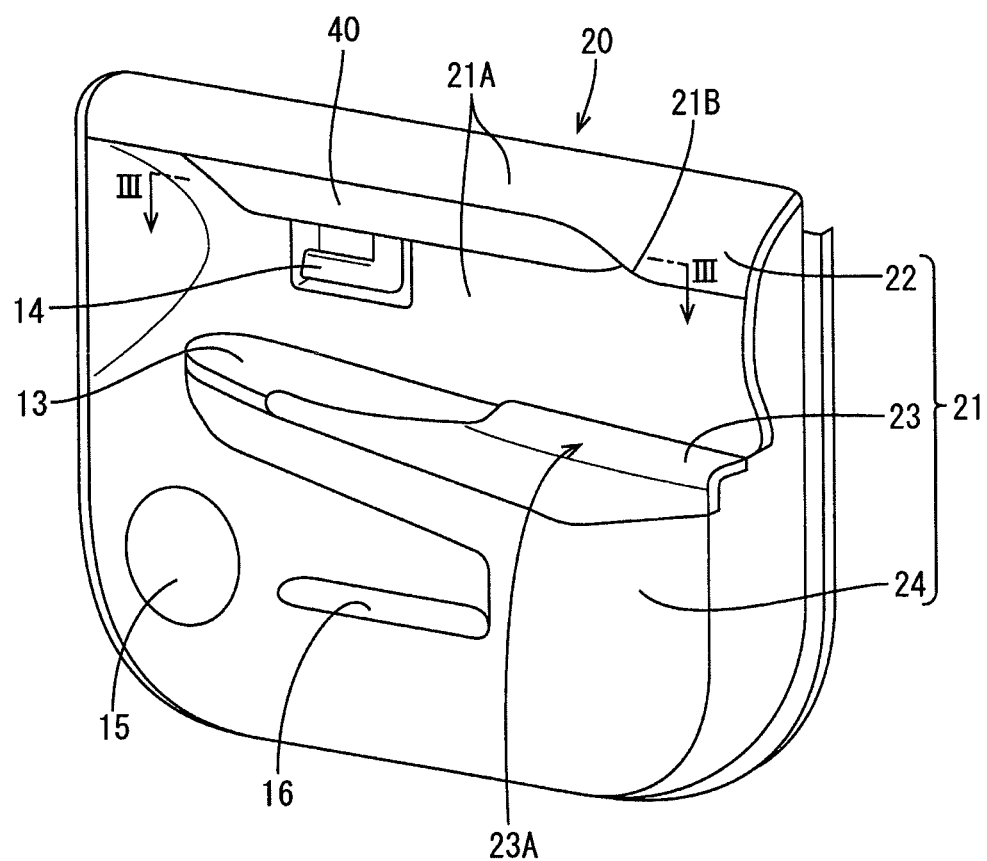
FIG. 2 is a perspective view of a door trim according to the first embodiment.

A first embodiment will be described with reference to FIGS. 1 to 5. A door trim 20 is an example of a vehicular interior component of a vehicle 10 according to this embodiment. In FIGS. 1 and 2, the left side is a front side of the vehicle, the right side is a rear side of the vehicle, the upper side is an upper side of the vehicle, and the lower side is a lower side of the vehicle.

As illustrated in FIG. 1, a door 11 is beside an occupant seat and used as a side door of the vehicle. The door 11 includes a vehicle body panel and the door trim 20. The vehicle body panel includes an inner panel 12 (see FIG. 3) and an outer panel (not illustrated). The door trim 20 is mounted on a compartment side of the vehicle body panel.

The door trim 20 includes a trim board 21 (a trim body) having a plate-like shape. The trim board 21 is made of synthetic resin such as polypropylene although materials for the trim board 21 are not limited to synthetic resin. For example, a mixture of plant fiber or synthetic resin can be used. A skin may be attached across surfaces of boards 22, 23, and 24 that constitute the trim board 21. Examples of materials for the skin include leather such as natural leather or synthetic leather, or a fabric such as a woven fabric, a knitted fabric, or a non-woven fabric.

As illustrated in FIG. 2, the trim board 21 includes several components. Specifically, the trim board 21 includes an upper board 22, an armrest board 23, and a lower board 24. The trim board 21 may include an ornament.

The upper board 22 is an upper portion of the trim board 21. The lower board 24 is a large portion of the trim board 21 below the upper board 22. The upper board 22 includes a mount base 30 on which the lower board 24 and an interior member 40, which will be described later, are mounted.

The mount base 30 extends outward of the vehicle from a lower end of a portion of the upper board 22 and further extends downward. The portion of the upper board 22 includes an upper area of a decorative surface 21A of the trim board 21, which will be described later. The portion of the mount base 30 extending downward is a mount portion. The mount portion includes through holes 31, which will be described later, and lower-board holes (not illustrated). The lower-board holes are formed below the through holes 31 and the lower board 24 is mounted to the mount base 30 by a known means using the lower-board holes.

As described above and as illustrated in FIG. 3, the mount base 30 includes the through holes 31 in which mounting projections 42 of the interior member 40 are inserted. The through holes 31 and the respective mounting projections 42 are aligned. The through hole 31 has a vertical dimension measuring in the vertical direction of the vehicle equal to a sum of a vertical dimension of the mounting projection 42 and a tolerance for the mounting projection 42 measuring in the vertical dimension of the vehicle. The mount base 30 includes holes as clearance portions 32 that continue to the respective through holes 31. Configurations of the clearance portions 32, how the mounting projections 42 are arranged in the through holes 31, and how the interior member 40 is mounted to the trim board 21 will be described later. In the following description, the through holes 31 will be indicated by the reference numerals 31D, 31B, 31A, 31C, and 31E in this sequence from the through hole 31 on the front side of the vehicle. The clearance portions 32 will be indicated by the reference numerals 32D, 32B, 32C, and 32E in this sequence from the clearance portion on the front side of the vehicle.

As illustrated in FIG. 2, the lower board 24 includes an armrest portion 23A that protrudes from a portion of the lower board 24 toward the inner side of the vehicle. The armrest portion 23A is at about a middle of the upper-lower direction of the door trim 20 and extends in a front-rear direction of the vehicle. The armrest board 23 constitutes a rear portion of the armrest portion 23A and is configured to be an armrest on which an occupant can place his or her arm. A front portion of the armrest portion 23A includes a through hole 13 for a switch base (not illustrated) to be mounted to the armrest portion 23A. As illustrated in FIG. 2, the lower board 24 includes an inside handle 14, a speaker grille 15, and a door pocket 16.

Figure 3:
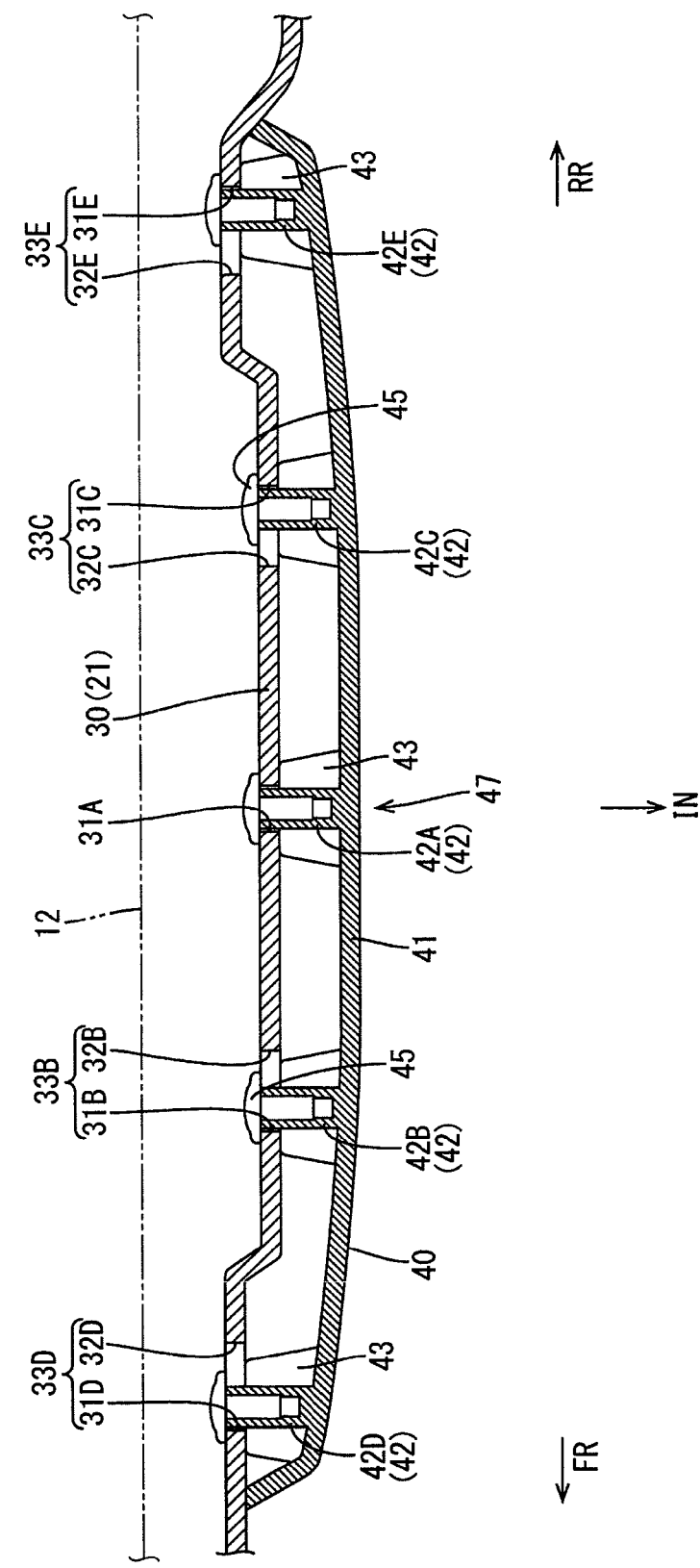
FIG. 3 is a cross-sectional view of a portion of the door trim including an interior member and a trim body cut along line in FIG. 2.

As illustrated in FIG. 1, the trim board 21 includes the decorative surface 21A configured as a sidewall surface of the compartment of the vehicle. As illustrated in FIG. 3, the portion of the trim board 21 including the decorative surface 21A is opposite a door panel (the inner panel 12). Namely, in a side collision of the vehicle, the portion of the trim board 21 including the decorative surface 21A tends to receive a load from the vehicular outer side via the door panel (the inner panel 12).

As illustrated in FIG. 2, the upper board 22 constitutes the upper area of the decorative surface 21A while the lower board 24 constitutes a lower area of the decorative surface 21A. Namely, the decorative surface 21A extends across the trim board 21 in the upper-lower direction of the vehicle. The decorative surface 21A further extends across the trim board 21 in the front-rear direction of the vehicle. A vertical direction of the decorative surface 21A corresponds to the horizontal direction (a direction perpendicular to the upper-lower direction of the vehicle), that is, corresponds to the front-rear direction of the vehicle. The interior member 40 is disposed between the upper board 22 and the lower board 24. More specifically, the upper board 22 includes a lower rear portion that extends downward. The lower board 24 includes an upper front portion that extends upward. The interior member 40 is disposed between the lower rear portion of the upper board 22 and the upper front portion of the lower board 24. Namely, the interior member 40 is disposed at a middle of the trim board 21 in the front-rear direction of the vehicle. According to this configuration, boundaries 21B among the upper board 22, the interior member 40, and the lower board 24 form curved lines that extend in the front-rear direction of the vehicle.

As illustrated in FIG. 2, the interior member 40 has an elongated shape. The interior member 40 is disposed on the decorative surface 21A side of the trim board 21 such that a longitudinal dimension of the interior member 40 is along a horizontal plane (i.e. in the horizontal direction of the decorative surface 21A and the front-rear direction of the vehicle). A preferable size of the longitudinal dimension of the interior member 40 is no more than a horizontal dimension of the decorative surface 21A (i.e. in the front-rear direction of the vehicle) and no less than one-third of the horizontal dimension of the decorative surface 21A, more preferably no less than one-half, and further more preferably no less than two-third. The quality of appearance of a door trim is considered to increase as the longitudinal dimension of an interior member increases. However, if a portion of the door trim is deformed by an external load, mounting projections of the interior member that are located farther from a portion of the door trim to which the load is applied is subjected to a larger force to displace the mounting projections. Namely, the longer interior member is more likely to break when the interior member is deformed. The technology according to this embodiment is effective for such a door trim including the longer interior member.

The interior member 40 is in a substantially middle in a horizontal dimension of the decorative surface 21A (i.e. middle in the front-rear direction of the vehicle). The middle of the decorative surface 21A is between pillars having higher rigidity (a front pillar and a center pillar in this embodiment). Namely, the door trim 20 tends to deform at the middle of the decorative surface 21A when the vehicle is in a side collision. The interior member 40 is above the armrest portion 23A and arranged such that the longitudinal dimension thereof extends in a direction in which the armrest portion 23A extends. Specifically, the interior member 40 extends frontward from a position opposite a chest of an occupant who is seated on a seat beside the door trim 20. In this configuration, by increasing an impact absorbing capability of the interior member 40, damage to the occupant resulting from a side collision impact can be effectively reduced.

As illustrated in FIG. 3, the interior member 40 includes an elongated panel 41 and the mounting projections 42. The panel 41 includes a decorative surface (a surface facing the inner side of the vehicle) and a back surface (a surface facing the outer side of the vehicle, a surface opposite from the decorative surface). The mounting projections 42 protrude from the back surface of the panel 41 toward the trim board 21 and mounted to the trim board 21. The mounting projections 42 include reinforcement ribs 43 at projection bases thereof closer to the back surface of the panel 41, respectively. Each reinforcement rib 43 has a cross shape that extends in the front-rear direction and the upper-lower direction of the vehicle and continues to the back surface of the panel 41. The interior member 40 that includes the panel 41, the mounting projections 42, and the reinforcement ribs 43 is made of a synthetic resin and integrally formed as a unitary single member.

As illustrated in FIG. 3, each mounting projection 42 has a hollow post-like shape and includes a hole for a screw 45. Multiple mounting projections 42 (five in this embodiment) are arranged along the longitudinal dimension of the interior member 40 (i.e. along a longitudinal dimension of the panel 41). The mounting projections 42 include distal portions that are ends thereof away from the panel 41 and are inserted in the respective through holes 31. More specifically, distal portions of the mounting projections 42 which are away from the panel 41 are inserted in the respective through holes 31 at a substantially right angle with respect to the respective through holes 31. The screws 45 are fitted in the holes in the respective mounting projections 42 from the outer side of the compartment. According to this configuration, the screws 45 fitted in the mounting projections 42 are held against hole edge portions around the respective through holes 31 and thus the mounting projections 42 are held against the hole edge portions around the through holes 31 via the screws 45. In the following description, the mounting projections will be indicated by the reference numerals 42D, 42B, 42A, 42C, and 42E in this sequence from the mounting projection on the front side of the vehicle. Namely, the mounting projection 42A is in the middle among the mounting projections 42. The mounting projection 42B and 42C are adjacent to the front and rear side of the mounting projection 42A, respectively. The mounting projections 42D and 42E are at the front most side and the rear most side among the mounting projections 42, respectively.

Figure 4:
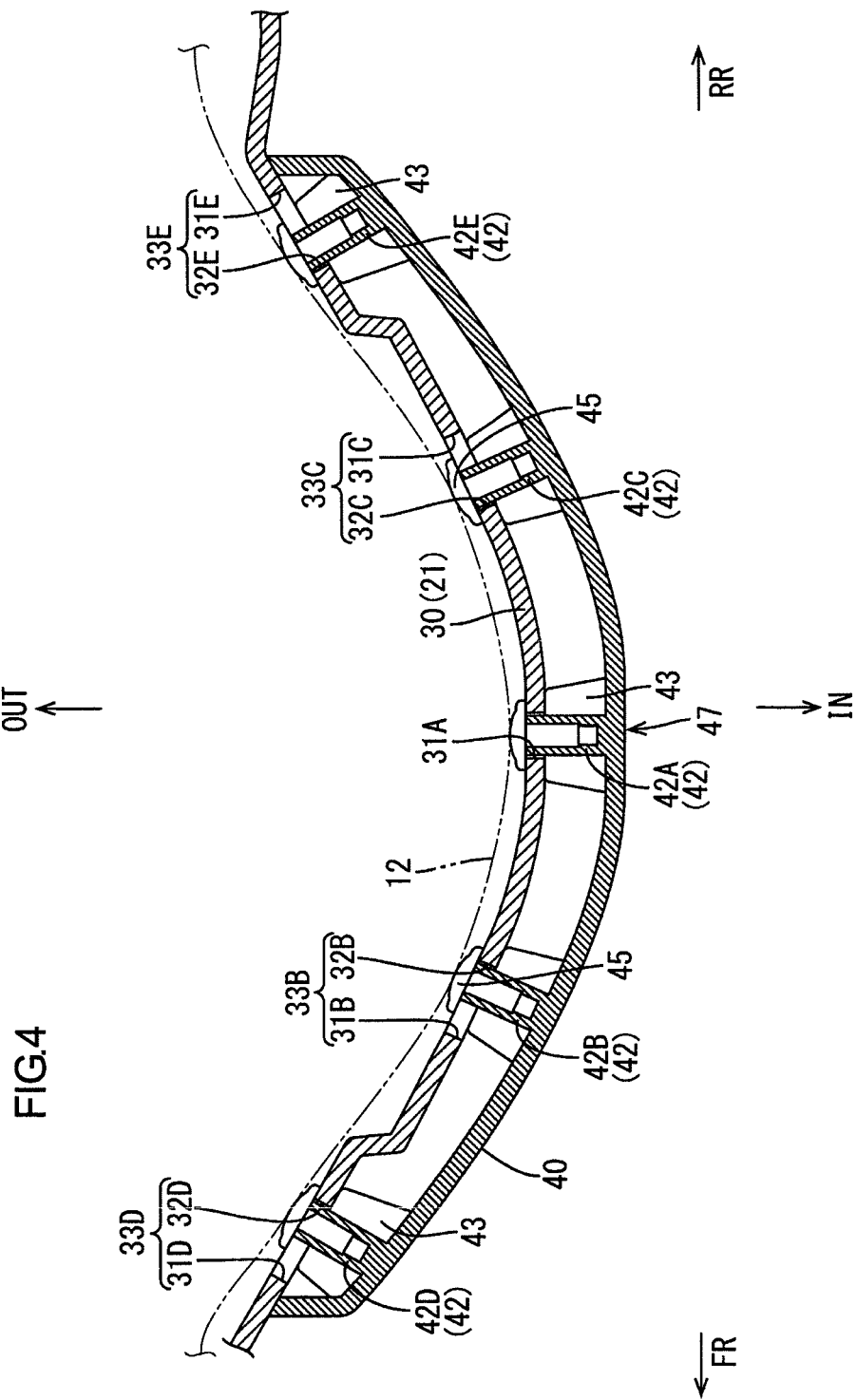
FIG. 4 is a cross-sectional view of the interior member and the trim body in FIG. 3 in a deformed position after a side collision.

Next, configurations of the clearance portions 32 will be described. In a side collision in which the vehicle hits an object such as a pole that extends in the vertical direction, a portion of the vehicle body panel including the inner panel 12 may be deformed. A portion of the door trim 20 corresponding to the portion of the vehicle body panel may be pushed by the portion of the vehicle body panel and deformed as illustrated in FIG. 4. In the side collision, a load may be applied to the door trim 20 including the trim board 21 and the interior member 40 from the outer side of the vehicle. If so, the trim board 21 and the interior member 40 are deformed.

A portion of the interior member 40 which is more likely to become a center of the deformation when a load is applied to the interior member 40 is defined as a deformation center 47. The deformation center 47 may be located between the mounting projection 42D, which is on a front side of the longitudinal dimension of the interior member 40 (a first end), and the mounting projection 42E, which is on a rear side of the longitudinal dimension of the interior member 40 (a second end). More specifically, the deformation center 47 is a portion including the mounting projection 42A (a fixing mounting projection).

The deformation center 47 may be a portion of the interior member 40 at which the interior member 40 tends to deform such as a middle portion of the longitudinal dimension of the interior member 40 or a portion of the interior member 40 opposite the middle of the door trim 20. The deformation center 47 may be a portion of the interior member 40 fixed to the trim board 21 with a larger fixing force in comparison to other portions of the interior member 40 (i.e. the portion including the mounting projection 42A in this embodiment), or a portion of the interior member 40 weaker than other portions of the interior member 40. The deformation center 47 may be a portion of the interior member 40 opposite an occupant who is on a seat on the inner side of the interior member 40, especially, a portion of his/her body corresponding to the head, chest, or abdomen of the occupant. The portion corresponding to the body of the occupant is regarded as a portion having a great influence on the occupant in a vehicle collision, depending on an impact absorbing capability of the interior member 40.

When a load is applied to the interior member 40 from the outer side of the vehicle, the distal portions of the mounting projections 42B, 42C, 42D, and 42E move from the respective through holes 31 to the respective clearance portions 32, as illustrated in FIGS. 3 and 4. Namely, the distal portion of each of the mounting projections 42 moves in a direction of the load. In other words, when a load is applied to the interior member 40, the distal portions of the mounting projections 42B, 42C, 42D, and 42E move from the respective through holes 31 toward the deformation center 47.

Figure 5:
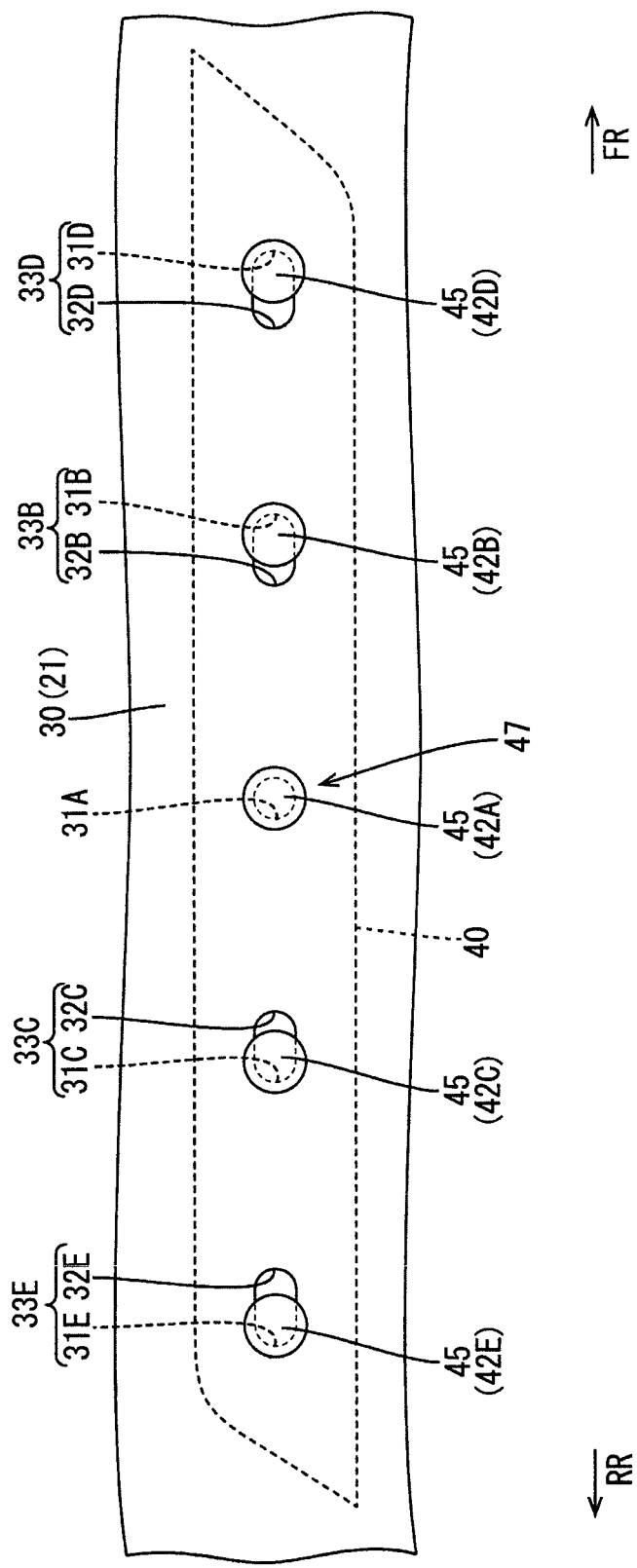
FIG. 5 is a plan view of the trim body in FIG. 3 seen from an outer side of the vehicle.

As illustrated in FIG. 5, the trim board 21 includes the clearance portions 32 corresponding to the mounting projections 42B, 42C, 42D, and 42E but does not include the one corresponding to the mounting projection 42A, which is at the middle of the interior member 40 (the deformation center 47). The through hole 31A (a fixing through hole) in which the mounting projection 42A (a fixing mounting projection) is arranged has a substantially round shape. The through holes 31B, 31C, 31D, and 31E and the clearance portions 32B, 32C, 32D, and 32E continue each other and have combined shapes of elongated holes 33B, 33C, 33D, and 33E (a mounting portion), respectively. In the following description, when the elongated holes 33B, 33C, 33D, and 33E are not required to be distinguished, they will be indicated with the reference numeral 33 without affixes B, C, D, or E.

As illustrated in FIG. 5, the elongated holes 33 extend toward a portion of the trim board 21 corresponding to the deformation center 47. Namely, the elongated holes 33 extend toward the middle of the longitudinal dimension of the interior member 40. More specifically, the elongated holes 33D and 33B that are on the front side with respect to the deformation center 47 extend toward the rear side of the vehicle. The elongated holes 33E and 33C that on the rear side with respect to the deformation center 47 extend toward the front side of the vehicle. Namely, the elongated holes 33D and 33B, which are on the front side of the vehicle, and the elongated holes 33E and 33C, which are on the rear side of the vehicle, extend toward each other. The elongated holes 33 do not extend away from the portion of the trim board 21 corresponding to the deformation center 47. That is, the elongated holes 33 only extend toward to the portion of the trim board 21 corresponding to the deformation center 47.

A dimension of each elongated hole 33 (a length of the clearance portion 32 in the front-rear direction) increases as a distance from the deformation center 47 increases. Specifically, the elongated holes 33B and 33C have the same dimension and the elongated holes 33D and 33E have the same dimension. The dimension of the elongated hole 33D, 33E is larger than the dimension of the elongated hole 33B, 33C.

Configurations of how the mounting projections 42 are arranged in the through holes 31 and how the interior member 40 is mounted to the trim board 21 will be described with reference to FIGS. 3 and 5. The mounting projection 42A at the middle of the interior member 40 is inserted in the through hole 31A. An outer surface of the mounting projection 42A fits along an entire edge of the through hole 31A. Specifically, the fixing through hole 31A (a fixing through hole) has a perimeter same as an outer perimeter of the fixing mounting projection 42A (a fixing mounting projection).

The mounting projections 42B to 42E are inserted in the respective elongated holes 33. Each mounting projection 42B, 42C, 42D, 42E is at a side of the corresponding elongated hole 33 far from the deformation center 47 (or the mounting projection 42A) and held against a hole edge portion along the corresponding elongated hole 33. More specifically, the mounting projections 42D, 42B are inserted in the elongated holes 33D, 33B so as to be positioned at the front sides of the respective elongated holes 33D, 33B (a first end side) and held against front hole edge portions along the respective elongated holes 33D, 33B. The mounting projections 42E, 42C are inserted in the elongated holes 33E, 33C so as to be positioned at the rear sides of the elongated holes 33E, 33C (a second end side) and held against rear hole edge portions along the respective elongated holes 33E, 33C. Namely, each mounting projection 42B, 42C, 42D, 42E is held at a C-shaped hole edge portion along the corresponding elongated hole 33B, 33C, 33D, 33E but not held at a portion along the corresponding elongated hole 33B, 33C, 33D, 33E close to the deformation center 47. The C-shaped region extends from an upper side of the hole edge to a lower side of the hole edge via the side of the hole edge farther from the deformation center 47.

According to the above configurations, a position of the interior member 40 in the front-rear direction is fixed (maintained). The outer surface of the mounting projection 42A is in contact with a front edge and a rear edge of the through hole 31A. Outer surfaces of the mounting projections 42D and 42B, which are on the front side with respect to the mounting projection 42A, are in contact with front edges of the respective elongated holes 33D and 33B and spaced away from rear edges of the respective elongated holes 33D and 33B. Outer surfaces of the mounting projections 42E and 42C, which are on the rear side with respect to the mounting projection 42A, are in contact with rear edges of the respective elongated holes 33E and 33C and spaced away from front edges of the respective elongated holes 33E and 33C. A position of the interior member 40 in the vertical direction is fixed (maintained) with the outer surfaces of the mounting projections 42A to 42E being in contact with upper and lower edges of the respective through holes 31 (the elongated holes 33). A position of the interior member 40 in the inner-outer direction of the compartment is fixed (maintained) by the reinforcement ribs 43 and the screws 45 that sandwich the hole edge portions along the respective through holes 31. More specifically, surfaces of the reinforcement ribs 43 on the outer side of the compartment and heads of the through holes 31 sandwich the hole edge portions along the respective through holes 31.

Next, functions of this embodiment will be described. In a collision in which the vehicle 10 hits against an object such as a pole which extends in the vertical direction, a portion of the vehicle body panel which has hit the pole is dented. The portion of the inner panel 12 included in the vehicle body panel may directly or indirectly push a portion of the door trim 20 corresponding to the portion of the vehicle body panel which is dented, as illustrated in FIG. 4, and thus the portion of the door trim 20 may be deformed toward the interior side of the vehicle. Namely, the trim board 21 of the door trim 20 is curved and the interior member 40 mounted to the trim board 21 is curved along the trim board 21. When the trim board 21 and the interior member 40 are curved, a force is applied to the projection base of each mounting projection 42 in a direction to displace the mounting projection 42 from the corresponding through hole 31 toward a portion of the interior member 40 to which the load is applied. However, if distal portions of the mounting projections are not displaced from the respective through holes, stresses are applied to the projection bases of the mounting projections. With the stresses, an angle of the distal portion of each mounting projection relative to the corresponding through hole may change from the original angle. If the stresses are larger than a tolerance, the mounting projections may be broken at the projection bases or the ornament member may be broken. The change in angle of the mounting projection relative to the corresponding through hole will be referred to as an angular change. In a portion around the deformation center 47 (the portion including the mounting projection 42A), the angular change in the front-rear direction of the vehicle (i.e. the horizontal direction of the decorative surface 21A) is less likely to occur.

As a comparative example 1, a configuration including a trim board without the clearance portion 32, which is included in the first embodiment, will be described. The trim board only includes round-shaped through holes that are aligned with mounting projections of an interior member, respectively. Similar to the first embodiment, the interior member of the comparative example 1 includes mounting projections that are integrally formed with a panel of the interior member. When a vehicle is in a side collision, stresses may be applied to the mounting projections from hole edges of the respective through holes (by the trim board). Specifically, stresses may be applied to the mounting projections 42D and 42B that are closer to a front side of the vehicle toward a front outer side of the compartment. Stresses may be applied to the mounting projections 42E and 42C that are closer to a rear side of the vehicle toward a rear outer side of the compartment. If stresses on the mounting projections 42B to 42E are larger than a tolerance, the mounting projections 42B to 42E may be broken at projection bases thereof or the panel 41 of the interior member 40 may be broken due to tension on the panel 41 pulled by the mounting projections 42B to 42E.

According to the configurations of the first embodiment, in a side collision, the distal portions of the mounting projections 42B to 42E move the respective clearance portions 32 (to the respective elongated holes 33). Specifically, the distal portions of the mounting projections 42D and 42B move toward the rear inner side of the compartment (toward the lower right direction in FIG. 4). The distal portions of the mounting projections 42E and 42C move toward the front inner side of the compartment (toward the lower left direction in FIG. 4). Namely, the distal portions of the mounting projections 42B to 42E move from the respective through holes 31; however, the distal portions of the mounting projection 42A do not move from the respective through holes 31. According to this configuration, the interior member 40 is more likely to curve at the portion thereof including the mounting projection 42A, compared with other portions of the interior member 40 including the mounting projections 42B to 42E. How the distal portions of the mounting projections 42B to 42E move is as follows. The distal portions of the mounting projections 42B to 42E move toward the inner side of the vehicle, that is, toward a direction of a load, more specifically, toward the deformation center 47. The distal portions of the mounting projections 42D and 42E located farther away from the deformation center 47 than the mounting projections 42B and 42C move larger distances than the distal portions of the mounting projections 42B and 42C. Therefore, the dimension of the clearance portions 32D and 32E in the front-rear direction is defined larger than the dimension of the clearance portions 32B and 32C so that the clearance portions 32B and 32E provide proper clearances for the distal portions of the respective mounting projection 42B to 42E. According to this configuration, the distal portions of the mounting projections 42B to 42E are less likely to hit the hole edge portions around the respective elongated holes 33. Even if the distal portions of the mounting projections 42B to 42E hit the hole edge portions around the respective elongated holes 33, loads applied to the distal portions of the mounting projections 42B to 42E are reduced. Namely, stresses are less likely to be applied to the mounting projections 42B to 42E.

As a comparative example 2, a trim board including through holes that have a longitudinal shape will be described. This configuration may be used for reducing expansion difference between an interior member 40 and the trim board or for compensating errors in position of mounting projections 42 in the longitudinal direction of the interior member 40. However, in this configuration, relationship is not taken into consideration between a shape of a door trim after the door trim is deformed and a direction in which the longitudinal holes extend. Namely, it is unclear whether the comparative example 2 can cancel out the change in angle of the mounting projection relative to the corresponding through hole 31 with the configuration in which the distal portions of the mounting projections 42 move from the respective through hole 31 toward a portion of the interior member 40 to which the load is applied. It is further unclear whether the configurations of the comparative example 2 can reduce stresses applied to the mounting projections 42 from the hole edges of the through holes 31 (trim board 21). In the configurations of the comparative example 2, different from the configuration of the first embodiment that includes the clearance portions 32, a proper impact absorbing capability is not exerted. In the first embodiment including the clearance portions 32, the distal portions of the mounting projections 42 move from the respective through holes 31 toward the direction of a load. This configuration cancels out the angular change of the mounting projection 42 of the interior member 40 relative to the corresponding through hole 31 of the trim board 21. Namely, the configurations of this embodiment are conceived based on an entirely new knowledge and completely different from a configuration that merely includes holes having a longitudinal shape.

With the trim board 21 including the clearance portions 32, in a side collision, the distal portions of the mounting projections 42B to 42E move toward the direction of a load. According to this configuration, stresses are less likely to be applied on the mounting projections 42B to 42E from the trim board 21. Namely, the mounting projections 42B to 42E are less likely to break at the projection bases thereof or the panel 41 is less likely to break. Namely, the interior member 40 is less likely to break due the load from outer side of the vehicle.

The clearance portions 32 of this embodiment are for allowing the mounting projections 42B to 42E to move when loads are applied to the mounting projections 42B to 42E in directions toward the deformation center 47 relative to the trim board 21. According to this configuration, when the interior member 40 deforms with the deformation center 47 as a center of the deformation and the angles of the mounting projections 42 relative to the respective through holes 31 change, the distal portions of the mounting projections 42B to 42E move from the respective through holes 31 to the respective clearance portions 32, that is, toward the deformation center 47. Therefore, stresses on the mounting projections 42B to 42E are reduced.

The distal portions of the mounting projections 42B to 42E move from the respective through holes toward the deformation center 47 within the respective elongated holes 33B to 33E. The clearance portion 32 and the through hole 31 are communicated with each other and do not obstruct the movement of the mounting projections 42B to 42E from the through hole 31 to the clearance portion 32. According to this configuration, stresses applied from the trim board 21 to the mounting projections 42B to 42E are effectively reduced compared with configurations including slits or weaker portions (e.g. thinner thickness) as the clearance portions 32. The slits may extend from the edges of the respective through holes 31 toward the deformation center 47. The weaker portion may be formed in the hole edge portions along the through holes 31 and the weaker portion may be weaker than other portions of the trim board 21.

The mounting projections 42B to 42E are held against the hole edge portions along the respective elongated holes 33B to 33E at the side of the respective elongated holes 3B to 33E far from the deformation center 47. According to this configuration, even though the clearance portions 32 are provided, the mounting projections 43B to 42E are fixed properly to the trim board 21 with larger fixing forces in comparison to a configuration in which mounting projections are not held against the hole edge portions at the side of the elongated holes far from the deformation center.

The deformation center 47 is in between the mounting projections 42D and 42B and the mounting projections 42E and 42C. According to this configuration, even if the interior member 40 deforms at the deformation center 47 and a force is applied to each mounting projection 42 toward the deformation center 47, the angle of the distal portion of the mounting projection 42 relative to the corresponding through hole 31 is less likely to change on each side of the deformation center 47.

The mounting projections 42D and 42B are held against the hole edge portions along the respective elongated holes 33D and 33B at one end side in the longitudinal dimension of the interior member 40 and the mounting projections 42C and 42E are held against the hole edge portions along the respective elongate holes 33C and 33E at another end side in the longitudinal dimension of the interior member 40 opposite to the one end. According to this configuration, the position of the interior member 40 in the longitudinal direction thereof is fixed (maintained).

Second Embodiment

A second embodiment will be described with reference to FIG. 1. An instrument panel 50 will be described as an example of a vehicular interior component. Similar configurations, operations, and effects to the above embodiments will not be described.

The instrument panel 50 is mounted to a front portion of a compartment of a vehicle and includes a trim board 121 and an interior member 140. The trim board 121 includes a decorative surface 121A, an upper decorative surface 51, and a hood 52. The decorative surface 121A is a sidewall surface of the compartment and extends in the upper-lower direction of the vehicle. The upper decorative surface 51 extends from an upper edge of the decorative surface 121A toward the front side of the vehicle. The hood 52 is on the upper decorative surface 51 and includes an opening that opens toward the upper decorative surface 51. The decorative surface 121A further extends in a width direction of the vehicle. A horizontal direction of the decorative surface 121A (i.e. the direction perpendicular to the upper-lower direction of the vehicle) corresponds to the width direction of the vehicle.

As illustrated in FIG. 1, the interior member 140 has an elongated shape. The interior member 140 is disposed on a decorative surface 121A of the trim board 121 with a longitudinal dimension thereof along the horizontal direction (the horizontal direction of the decorative surface 121A and the width direction of the vehicle). The interior member 140 is at a middle of a portion of the instrument panel 50 closer to a passenger's seat. A middle of the longitudinal dimension of the interior member 140 is defined as a deformation center 147. The deformation center 147 is opposite a passenger who is seated on the passenger's seat. Configurations of how the interior member 140 is fixed to the trim board 121 are similar to those of the first embodiment.

According to the configuration, the interior member 140 is less likely to break in a head-on vehicle collision.

Third Embodiment

A third embodiment will be described with reference to FIGS. 6 and 7. A door trim 220 according to this embodiment includes an interior member 240 that is in a different position from the interior member 40 of the first embodiment. Similar configurations, operations, and effects to the above embodiments will not be described.

Figure 6:
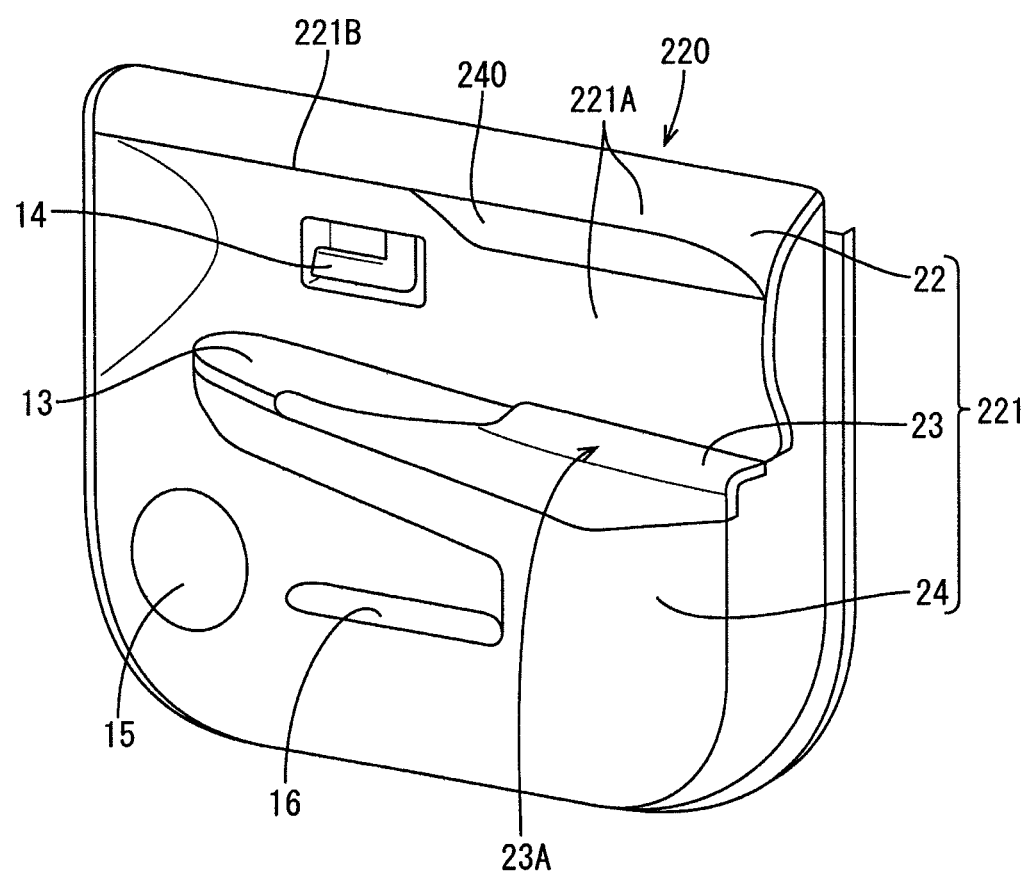
FIG. 6 is a perspective view of a door trim according to a third embodiment.

As illustrated in FIG. 6, the interior member 240 is on a rear portion of a decorative surface 221A (a boundary 221B). The interior member 240 does not correspond to a middle of the decorative surface 221A of a trim board 221 in the front-rear direction of the vehicle, namely, not correspond to a portion of the trim board 221 at which the trim board 221 tends to deform. The interior member 240 does not include a portion corresponding to the deformation center 47 included in the first embodiment. The interior member 240 extends along a portion of the trim board 221 corresponding to an occupant who is seated on a seat beside the trim board 221. In this configuration, by increasing an impact absorbing capability of the interior member 240, damage to the occupant resulting from a side collision impact can be effectively reduced.

As illustrated in FIG. 7, mounting projections 42 and through holes 31 are aligned, respectively. The clearance portions 232 are for allowing distal portions of the mounting projections 42 to move when loads are applied to the interior member 240 from the outer side of the vehicle. In this embodiment, the distal portions of the mounting projections 42 move toward the middle of the trim board 221 (i.e. toward a portion of the trim board 221 at which the trim board 221 tends to deform), which is a portion in which the loads are applied.

As illustrated in FIG. 7, the trim board 221 includes the clearance portions 232 that correspond to all of the mounting projections 42. Specifically, every through hole 31 continues to the clearance portion 232 to form the elongated hole 33 (a projection link portion).

The elongated holes 33 extend toward the middle of the door trim 220 but not extend toward an opposite side from the middle of the door trim 220 (i.e. toward the rear side of the vehicle). Namely, all of the elongated holes 33 extend in the same direction, that is, a direction toward the middle of the door trim 220. A dimension of each elongated hole 33 (a dimension of clearance portion 32) increases as a distance from the middle of the door trim 220 increases.

With the trim board 221 including the clearance portions 232, the distal portion of each the mounting projection 42 moves from the corresponding through hole 31 toward a direction of a load. According to this configuration, stresses applied to the mounting projections 42 by the trim board 221 are reduced. Therefore, the mounting projections 42 are less likely to break at the projection bases thereof or the panel 41 is less likely to break. Namely, breakage is less likely to occur in the interior member 240.

Fourth Embodiment

A fourth embodiment will be described with reference to FIG. 8. A door trim 320 according to this embodiment includes clearance portions 332 that have different shapes from the clearance portions 32 of the first embodiment. Similar configurations, operations, and effects to the above embodiments will not be described.

The clearance portions 332 have slit like shapes. The clearance portions 332 are formed corresponding to mounting projections 42B, 42C, 42D, and 42E but not formed corresponding to a mounting projection 42A that is at a middle of an interior member 40 (a deformation center 47). A through hole 31A in which the mounting projection 42A is inserted has a substantially round shape. The through holes 31B, 31C, 31D, and 31E in which the mounting projections 42B, 42C, 42D, and 42E are inserted, respectively, are communicated with the respective clearance portions 332.

Each clearance portion 332 is a slit that extends from an edge of the through hole 31 closer to a deformation center 47 toward a portion of the door trim 320 corresponding to the deformation center 47. A direction in which the clearance portions 332 extends and longitudinal dimensions of the respective clearance portions 332 are similar to those of the clearance portions 32 of the first embodiment.

The clearance portions 332 of this embodiment are slits. According to this configuration, although the clearance portions 332 are communicated with the respective through holes 31, each of the mounting projections 43B to 42E and the trim board 21 are fixed with a fixing force without decreasing the fixing force in comparison to the configurations of the first embodiment.

Other Embodiments

The technology described herein is not limited to the above embodiments described in the above description and the drawings. The technology described herein may include the following embodiments.

(1) The vehicular interior component is not limited to the door trim for the front door or the instrument panel. A door trim for a rear door, a quarter trim, a pillar garnish may be included in the scope of the present technology. The number of the interior components to which the present technology is applied is not limited to one per vehicle but may be more than one.

(2) The clearance portion is not limited to the portion communicated with the through hole to form the elongated hole or the slit. The clearance portion may be an independent hole from the through hole (e.g. perforation) or a hole edge portion along the through hole with a thickness smaller than other hole edge portions along the through hole.

(3) The number, location, shape, size of the clearance portion and the mounting projection can be properly altered depending on deformation level of the interior component in application of a load.

(4) The mounting projections of the above embodiments are fixed to the trim body with screws, which are the component different from the mounting projections. However, the mounting projections may be fixed to the trim body by heat staking.

(5) The number of the mounting projections are not limited to five but may be one to four, six, or more than six based on shapes of the interior member 40.

What is claimed is:

1. A vehicular interior component comprising:
a trim body including:
a decorative surface configured as a sidewall surface of a compartment of a vehicle, and
at least one mounting portion including a through hole and a clearance portion, the clearance portion is arranged adjacent to the through hole in a longitudinal direction of the trim body; and
an interior member having a longitudinal shape mounted to the trim body with a longitudinal dimension thereof along a horizontal direction, and including at least one mounting projection projecting toward the trim body, wherein
the at least one mounting projection is arranged in the through hole and configured such that when an external load is applied to the interior member at least a portion of the at least one mounting projection moves from a position in which the portion of the at least one mounting projection is held against an edge of the through hole to the clearance portion toward a location at which the external load is applied to the interior member.

2. The vehicular interior component according to claim 1, wherein
the interior member further includes a portion defined as a deformation center which becomes a center of the deformation when the load is applied to the interior member, and
the at least a portion of the at least one mounting projection moves from the through hole toward the deformation center.

3. The vehicular interior component according to claim 2, wherein
the clearance portion is a hole that continues to the through hole,
the through hole and the clearance portion have a combined shape of an elongated hole extending toward a portion of the trim body opposite the deformation center.

4. The vehicular interior component according to claim 3, wherein
the at least one mounting portion includes a first mounting portion and a second mounting portion,
the at least one mounting projection includes a first mounting projection and a second mounting projection,
the first mounting projection is closer to a first end of the longitudinal dimension of the interior member than the deformation center,
the second mounting projection is closer to a second end of the longitudinal dimension of the interior member than the deformation center,
the first mounting projection is held against the edge of the through hole of the first mounting portion closer to the first end, and
the second mounting projection is held against the edge of the through hole of the second mounting portion closer to the second end.

5. The vehicular interior component according to claim 4, wherein
the at least one mounting projection includes a first plurality of mounting projections provided between the first mounting projection and the deformation center and the at least one mounting projection further includes a second plurality of mounting projections provided between the second mounting projection and the deformation center.

6. The vehicular interior component according to claim 5, wherein a dimension of the clearance portion of the at least one mounting portion measured in the horizontal direction increases as a distance from the deformation center increases.

7. The vehicular interior component according to claim 2, wherein
the through hole is located farther from the deformation center than the clearance portion is located, and
the at least one mounting projection is held against the edge of the through hole farther from the deformation center.

8. The vehicular interior component according to claim 2, wherein
the clearance portion is closer to the deformation center than the through hole is, and
the clearance portion is a slit extending from an edge of the through hole closer to the deformation center toward the deformation center.

9. The vehicular interior component according to claim 8, wherein
the at least one mounting projection includes a plurality of mounting projections,
the at least one mounting portion includes a plurality of mounting portions, and
a dimension of the clearance portion of each mounting portion of the plurality of mounting portions measured in the horizontal direction increases as a distance from the deformation center increases.

10. The vehicular interior component according to claim 1, wherein
the interior member includes a panel extending in the horizontal direction, the panel including a back surface facing the trim body, the at least one mounting projection projects from the back surface toward the trim body, and the at least a portion of the at least one mounting projection is a distal portion at an end thereof away from the panel, the distal portion being in the through hole.

11. The vehicular interior component according to claim 10, wherein
the interior member further includes a fixing mounting projection projecting from the back surface of the panel toward the trim body,
the trim body further includes a fixing through hole in which the fixing mounting projection fits, the fixing through hole having a perimeter same as an outer perimeter of the fixing mounting projection, and
the fixing mounting projection and a portion of the panel from which the fixing mounting projection projects are defined as a deformation center.

12. The vehicular interior component according to claim 11, wherein a middle of the longitudinal dimension of the interior member is defined as the deformation center.

13. The vehicular interior component according to claim 1 wherein
the trim body is a board member having a longitudinal dimension along the longitudinal dimension of the interior member,
the interior member is located at a portion of the trim body between an end of the longitudinal dimension of the trim board and a middle of the longitudinal dimension of the trim body,
the clearance portion is a hole that continues to the through hole,
the through hole and the clearance portion have a combined shape of an elongated hole extending toward the middle of the longitudinal dimension of the trim body,
the through hole is located farther from the middle of the longitudinal dimension of the trim body than the clearance portion is located, and
the at least a portion of the at least one mounting projection is held against the edge of the through hole farther from the middle of the trim body.

14. The vehicular interior component according to claim 13, wherein
the at least one mounting projection includes a plurality of mounting projections,
the at least one mounting portion includes a plurality of mounting portions, and
a dimension of the clearance portion of each mounting portion of the plurality of mounting portions measured in the horizontal increases as a distance from the middle of the trim body increases.

* * * * *